United States Patent [19]
Link

[11] Patent Number: 5,184,303
[45] Date of Patent: Feb. 2, 1993

[54] VEHICLE ROUTE PLANNING SYSTEM
[75] Inventor: Laura J. Link, Hanover Park, Ill.
[73] Assignee: Motorola, Inc., Schaumburg, Ill.
[21] Appl. No.: 662,674
[22] Filed: Feb. 28, 1991
[51] Int. Cl.[5] ............................................. G06F 15/50
[52] U.S. Cl. .................... 364/449; 340/995; 364/444
[58] Field of Search ............... 364/449, 444, 424.05; 340/990, 995; 73/178 R

[56] References Cited

U.S. PATENT DOCUMENTS

| | | | |
|---|---|---|---|
| 4,477,874 | 10/1984 | Ikuta et al. | 364/424.05 |
| 4,796,189 | 1/1989 | Nakayama et al. | 364/449 |
| 4,984,168 | 1/1991 | Neukrichner et al. | 364/449 |
| 4,992,947 | 2/1991 | Nimura et al. | 364/444 |
| 4,994,974 | 2/1991 | Cummings | 364/443 |
| 5,023,798 | 6/1991 | Neukirchner et al. | 364/449 |
| 5,067,082 | 11/1991 | Nimura et al. | 364/449 |
| 5,121,326 | 6/1992 | Moroto et al. | 364/449 |

OTHER PUBLICATIONS

*Real-Time Route Planning in Road Networks*, by John Guzolek and Edward Koch, Navigation Technologies Corporation, CH2789-6/89/0000-0165; IEEE, 1989.
*Giving Cars a Mind of Their Own*, by Thomas A. Nobbe, Machine Design/Jun. 21, 1990.
CRN0005 Patent Application, Kirson, Serial No. 07/610,636; Filed Nov. 8, 1990, entitled "Land Vehicle Multiple Navigation Route Apparatus".
CRN0007 Patent Application, LeFevre, Serial No. 07/581,495; Filed Sep. 12, 1990, entitled "Land Vehicle Navigation Apparatus with Visual Display".

*Primary Examiner*—Thomas G. Black
*Attorney, Agent, or Firm*—Phillip H. Melamed; John H. Moore

[57] ABSTRACT

Vehicle route planning system (10) uses a route planning apparatus (13, 19) to calculate a desired route between start and destination locations. Apparatus (16, 17) provides route information based on the calculated route. The route is calculated in accordance with fixed road path data stored in a memory (14). A user of the system (10) uses input devices (11, 12) to specify "detour" data that define what stored road path data should not be considered in calculating the desired route. A navigation computer (13) allows the system user to designate the detour data as "system detour data" to be used for excluding road path data for all routes calculated for all drivers to all destinations or to designate the user specified detour data as "subsystem detour data" which is used for excluding road path data for calculating some, but fewer than all, routes to be calculated. Preferably, the subsystem detour data includes driver ID associated detour (route calculation) data and/or trip associated detour data. The user designation and entry of different types of detour data allows the system (10) to achieve system flexibility while minimizing the time and effort involved by the user in entering detour data which may be used in calculating several trips.

28 Claims, 5 Drawing Sheets

DETOUR TYPES
1. SYSTEM
2. CURRENT DRIVER
3. CURRENT TRIP

DETOURS
1. INTERSECTION
2. ROAD SEGMENT
3. ROADWAY
4. GEOGRAPHIC REGION

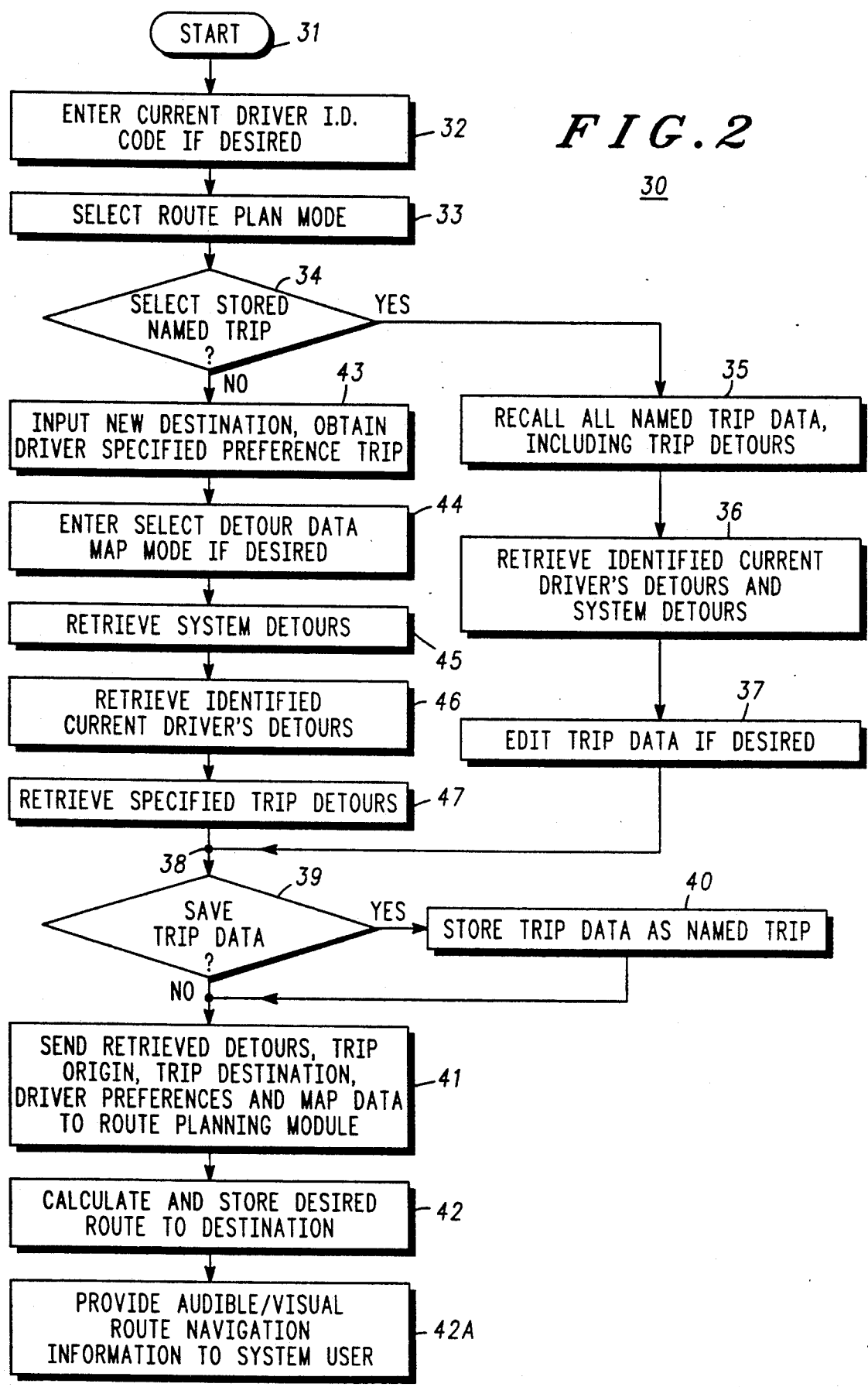

VEHICLE ROUTE PLANNING SYSTEM

FIELD OF THE INVENTION

The present invention relates to the field of vehicle route planning systems, and in particular to such systems which utilize fixed road path data to calculate a desired route to a specified destination.

BACKGROUND OF THE INVENTION

Some route planning systems exist which utilize fixed road path data stored in a memory to calculate a desired route to a specified destination. In some of these systems, a system user (generally the driver of a vehicle) can specify some road segments which are not to be used or considered in planning a route to a user specified destination. This is done by the user specifying "detour data" wherein such detour data defines the road path data not to be used in planning a desired route. In such prior systems, all the user specified detour data is treated in exactly the same way. Typically all user specified detours are interpreted as applying only to a specific trip to be planned. Therefore, for planning any new trip to a new destination, all desired detour data had to be reentered into the route planning system, even if the user might want to use the same detour data he had specified for a prior trip. Typically the entering of detour data is relatively time consuming. Thus requiring the reentry of detour data into a route planning system is not desired.

Even if a prior system was designed to save all detour information used for one trip such that it would apply to every subsequent trip, many times the detour data entered by the user was just intended to apply to just one trip and/or the entered detour data was just intended to apply to trips to be planned for just a particular identified driver. Thus prior systems did not provide enough system flexibility for handling the entry of user specified detour data such that the detour information was used in a desired manner to accommodate different route planning situations without requiring substantial additional time and effort on the part of the system user/driver.

Some prior route planning systems contemplate the system receiving radio broadcasted detour information. This received broadcasted information is then used for the calculation of all trips by the system for a specified time duration. However, this type of detour information is not detour information which is specified by the user/driver. Also, such a system does not suggest or provide a flexible system which handles different types of user specified detour information in different desired manners. The end result is that in prior route planning systems the user may have to engage in time consuming additional effort in reentering or erasing prior detour data to ensure the use of prior detour data for subsequent trips in the manner which he desires.

SUMMARY OF THE INVENTION

In one embodiment of the present invention a vehicle route planning system is provided. The system includes a map memory which stores fixed road path data corresponding to the roadways which exist at least between start and destination locations. In addition, the system has a detour apparatus by which the user of the system can designate which of the stored road path data should be excluded in calculating a desired route between the start and destination locations. A route planning apparatus is provided for using the start and destination locations and the fixed road path data, exclusive of the road path data corresponding to the detour data, to calculate and provide information as to a desired route between the start and destination locations. An improvement to the above described system is described herein and includes the detour apparatus having a system detour apparatus which allows the user to designate some detour data as system detours to exclude some road data from use by the route planning apparatus in calculating all desired routes calculated by the route planning apparatus. In addition, the detour apparatus described herein includes a subsystem detour apparatus which allows the system user to designate some of the detour data as subsystem detours to exclude some road data from use by the route planning apparatus in calculating some, but fewer than all, of the desired routes to be calculated by the route planning apparatus.

Basically, the preferred embodiment of the invention allows the route planning user/driver to designate some detour data as system detour data which defines what road segment data should be excluded from all routes to be calculated by the route planning apparatus. In addition, the system user can designate some detour data as trip detour data such that it is only used by the route planning apparatus when the apparatus is calculating a desired route to a specific user specified destination location. Also, a system user may designate user specified detour data as driver detour data such that the route planning apparatus will exclude road path data corresponding to the driver detour data for all desired routes to be calculated between any start and destination locations for routes planned for a vehicle driver identified as having an ID code corresponding to an ID code associated with the driver detour data.

The preferred embodiment of the present invention allows a system user to enter detour data into the system but choose designating this detour data as either system detour data, driver detour data or trip detour data. The end result is that depending upon the designation of the detour data by the user, the route planning apparatus will utilize this detour data differently and in accordance with the desires of the user. This provides the route planning system with flexibility and eliminates the need for having the system user constantly reenter or modify detour data which he previously entered into the system and now wishes to use again in calculating a different trip, possibly by a different driver and possibly to a different destination.

A significant feature of the preferred embodiment of the present invention provides for storing detour (route calculation) data associated with different driver ID codes such that each driver, once he has identified himself to the route planning system, will have the route planning system use his personal previously specified detour data for his trip planning, as well as any additional detour data which he may then choose to enter. Clearly this saves substantial time in reentering personal preference detour data of individual drivers. Also, the described system allows designating some detour data as system detour data such that for all trips, regardless of the vehicle driver and regardless of the destination, such data will be considered in excluding road path segments from use by the route planning apparatus. Again this eliminates the need for repetitive reentry of the same detour data for subsequent trips.

BRIEF DESCRIPTION OF THE DRAWINGS

For a more complete understanding of the present invention, reference should be made to the drawings in which:

FIG. 2 is a general route planning flowchart describing operation of the system in FIG. 1;

DETAILED DESCRIPTION OF THE PREFERRED EMBODIMENTS

Figures 1, 4, 5:
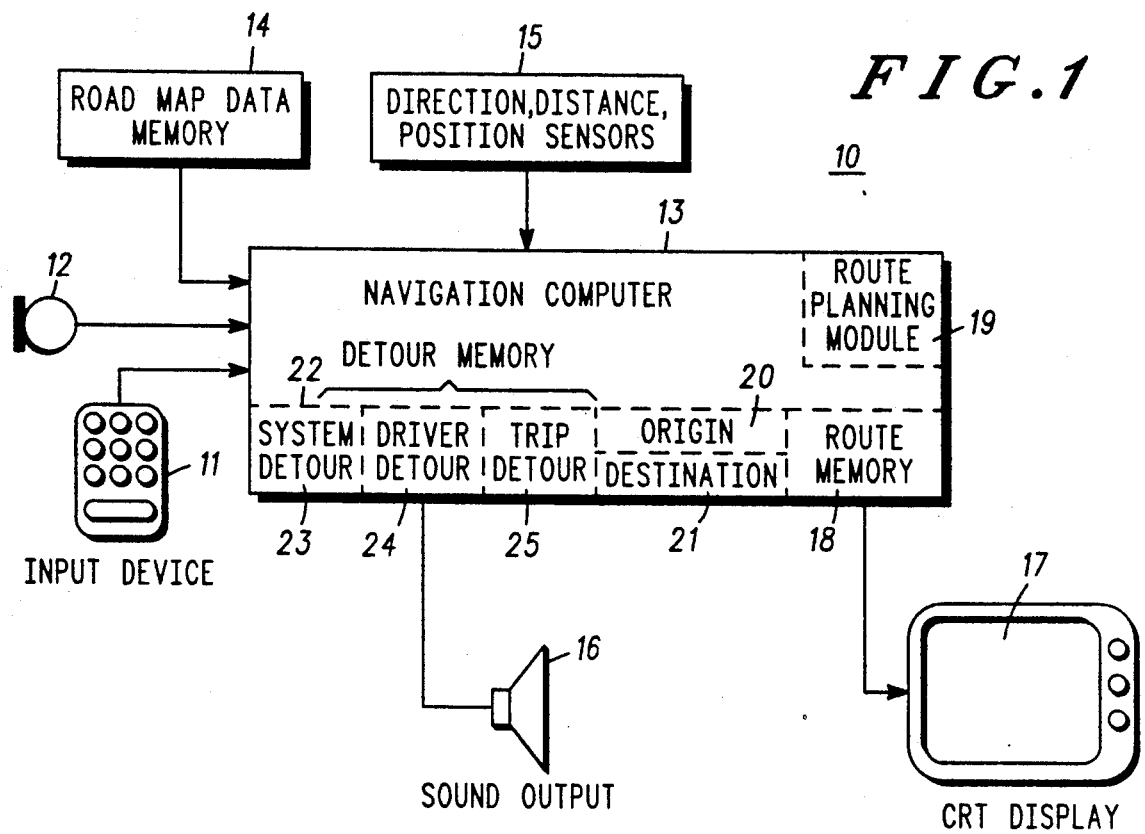
FIG. 1 is a schematic diagram of a vehicle route planning system.
FIG. 4 is a graphic visual representation of a detour display screen provided by the system in FIG. 1.
FIG. 5 is a graphic visual display of another detour display screen provided by the system shown in FIG. 1.

Referring to FIG. 1, a vehicle route planning system 10 is illustrated which preferably is intended for installation in a vehicle (not shown). The route planning system 10 includes a keyboard data input device 11 and a microphone data input device 12 for providing commands and data input to a navigation computer 13. A road map data memory 14 stores fixed road path data corresponding to fixed roadways located over a predetermined geographical area. The road map memory 14 also provides an input to the navigation computer 13. Direction, distance and position sensors 15 are also provided and provide data input information to the navigation computer 13. The navigation computer 13 provides an audible output to a speaker 16 and electronic signals which define a visual output to a CRT display 17. Essentially, in response to system user inputs provided via the input devices 11 and/or 12, the navigation computer 13 will plan a desired route, via fixed roadways defined by the data in the road map memory 14, and store the desired route, at least temporarily, in a route memory location 18 contained in the navigation computer 13. The actual planning of the desired route is accomplished by a route planning module 19 which is part of the navigation computer 13. The module 19 represents specific route planning software programmed into the computer 13.

The navigation computer 13 also includes an origin data memory 20, a destination data memory 21 and a detour memory 22 which has at least three subdivisions. One of the detour memory subdivisions is a system detour memory 23, and driver detour and trip detour memories 24 and 25 comprise subsystem detour memories which are part of the detour memory 22.

Essentially, a user and/or driver of a vehicle asks the navigation computer 13 to calculate a desired route, via fixed roadways, to a destination which the user then specifies. The navigation computer 13 then determines the initial position of the vehicle either via the sensors 15 or an origin input specified by the user via the input devices 11 and 12. The computer 13 then retrieves roadway information from the road map data memory 14 and also utilizes any detour information contained in the memory locations 23 through 25. All this information is provided to the route planning module 19 which then proceeds to calculate a desired route from the vehicle start location to the user specified desired destination.

Many prior systems calculate desired routes between start and destination locations via fixed roadways, and many of these systems exclude road path data defined by stored detour data. Some systems, after calculating the desired route, then provide a vehicle driver with navigation instructions via audible commands and/or visual displays such that the vehicle driver will implement the desired route. In providing the navigation instructions the navigation computer 13 will utilize the calculated route and inputs from the sensors 15 relating to distance traveled, direction of the vehicle and current position of the vehicle as sensed by either dead reckoning and/or a global position system receiver. The sensors 15 may also provide the current vehicle position data which is continually updated and stored in origin memory 20.

A main feature of the present invention generally relates to the manner in which the system 10 allows the user to enter detour information while designating this detour information as either system detour data or subsystem detour data. The route planning module then selectively utilizes system detour data in one manner and utilizes subsystem detour data in a different manner. This feature is best explained by reference to the flowcharts and other figures which describe the operation of the vehicle route planning system 10.

Referring now to FIG. 2, a route plan flowchart 30 is illustrated which in general described the operation of the navigation computer 13 in responding to a request by a system user to plan a desired route. The flowchart commences at a start location 31 and proceeds to a process block 32 at which the system user can enter, if he so desires, the ID code of a current driver for which the desired route is to be planned. In essence, a display will be produced on the CRT display 17 which will ask for the entry of a driver ID code. If the driver enters an ID code, this will be stored in a memory location in the computer 13 such that the computer will then keep track of which driver it is to calculate a desired route for. If no ID code is entered, then the navigation computer 13 realizes that the route which it may be asked to plan will be a general route applicable to any driver.

Process block 32, as well as many other process blocks to be subsequently described, contemplates having the computer 13 programmed to carry on an interrogation of the system user by providing the user with audible and/or visual prompts or questions, via speaker 16 and/or display 17, and waiting for a response from the user via input devices 11 and/or 12. In general such programming is conventional and well within the capabilities of ordinary computer programmers.

From process block 32 control passes to process block 33 at which the system user selects a route planning mode. Preferably this is done via menu selection by having the user select, from a menu displayed on the CRT display 17, which of several different modes of operation are desired. Alternatively, instead of providing the user with a menu choice, the user may enter a command to instruct the navigation computer 13 to enter into a route planning mode of operation. Both of these techniques are commonly used for computer/person communication interfaces. Flowchart 30 presumes selection of the route plan mode and other mode selections are not shown.

After selecting a route plan mode, control passes to a decision block 34 which asks the user if the route to be planned is an old route which has been stored and given a name (yes) or a new route (no). This question is answer by the user providing information to the navigation computer via the input devices 11 or 12. If the user indicates that this is an old stored trip and identifies it by its name, a process block 35 recalls all of the stored trip data associated with this previous stored trip which data includes the destination and all trip detours which were stored. Control then passes to a process block 36 which retrieves any driver detour data in memory 24 which has a driver ID code identical to the ID code entered by the user in process block 32. If there has been no driver ID code entered via block 32, then no additional driver detour information is recalled or retrieved by block 36. Block 36 also retrieves any current system detour information stored in memory 23.

After block 36, a process block 37 is reached which allows the system user to edit any of the trip data which has been recalled if such editing is desired. If not, then information flow proceeds to a terminal 38 and from there to a decision block 39 which asks if this trip data defining a specific trip to be calculated should be stored. If the answer supplied to the navigation computer 13 by the system user via the input devices 11 and 12 is yes, then a process block 40 will store this trip as a named trip with a name given to it by the system user. Block 40 stores the named trip destination and trip detour information for the named trip.

After process block 40 or if the response to the decision block 39 is no, control flows to a process block 41 which sends all of the trip information to the route planning module 19. This includes sending all retrieved detour data, as well as vehicle origin (current position) data in memory 20 and desired destination data in memory 21. Then a process block 42 calculates a desired route to the user specified desired destination and this desired route is stored in the route memory 18 of the navigation computer. This represents the end of the route planning function of the navigation computer. However, the computer then utilizes this planned and stored route, via block 42A, to implement audible and/or visual navigation information instructions, via speaker 16 and display 17, to the vehicle operator to assist him in implementing the desired route. However, if the vehicle route planning system is intended for use outside the vehicle, then block 42A represents just providing a print out of navigation instructions to the vehicle operator and/or providing a visual display by display 17 of the calculated route to the system user. The visual displayed navigation instructions can include text instructions and/or turn arrow graphics or a visual graphic display of the calculated route.

What has been described above represents the operation of the route planning system 10 if the route planning system user selects implementation of a previously stored trip and uses previously stored data for calculating a desired navigation route to a user specified destination. Planning a route based on stored trip information, rather than recalling a previously calculated route, will be implemented by the navigation computer 13 generally because there is insufficient room in the navigation computer memory to store information on a large number of prior routes which have been calculated. Therefore, just the data which was used by the route planning module in previously calculating a desired route is what is stored and recalled by the process block 35. Then this trip information is again sent to the route planning module 19 for use.

If the system user determines that he desires calculation of a new route to a new destination, then his answer to the decision block 34 is no and process flow continues to a process block 43. At block 43 the system user will specify a new desired destination to the navigation computer 13 and this will be stored in memory 21. The process block 43 will also ask the system user for any specified trip "preferences" wherein this is distinguish from "detours" in that preferences are positive inclusions in any route to be calculated wherein these inclusions are specified by the user. The providing of such inclusions or driver preferences is conventional in prior route planning systems and therefore will not be further described since they merely involve allowing the system user to specify that he desires such things as a scenic route versus the quickest route or the shortest mileage route versus the shortest time route or travel on a specific road or road type versus travel on any road.

After process block 43, control passes to process block 44 wherein the navigation computer 13 allows the user to enter a detour data entry mode if he desires. The operation of the system 10 during this detour data entry mode is illustrated in the flowchart shown in FIGS. 3A, 3B and 3C and the display screens illustrated in FIGS. 4 and 5, and the manner in which detour data is entered forms a significant feature of the route planning system 10. Basically, the detour data entry mode allows the system user to enter/specify some detour data, which data defines which road path data in the road memory 14 is to be ignored by the route planning module 19, and to designate this entered detour data as either being system detour data, driver detour data or trip detour data. The significance of this is that depending on what designation is given to the entered detour data, this designation will determine how this data is to be utilized. By allowing the user to designate three different types of detour data, the route planning system 10 is provided with system flexibility that eliminates the need for the user to reenter the same detour data when it is desired to reuse, selectively, previously specified detour data for subsequent trips to be planned by the route planning module 19.

For system detour data, the system detour data will apply to any trip to any location by any driver. The planning system 10 insures that such system data will apply to all such trips. However, the route planning system 10 also allows the system user to designate detour data as associated with an ID code that identifies a vehicle driver. In such a case, if the route planning system 10 knows that it is planning a route for an identified driver, who is identified to the system 10 by the process block 32, it will then also utilize any corresponding driver detour data for the identified driver when planning a route. Also, the system user may designate some entered detour data as being just for a specific trip which the route planning module is to calculate a route for. In that case, this trip detour data will automatically be erased after the completion of the trip unless the system user decides to save all of the trip data which defines the trip for which the route planning module 19 will calculate a route for.

Figure 3A:
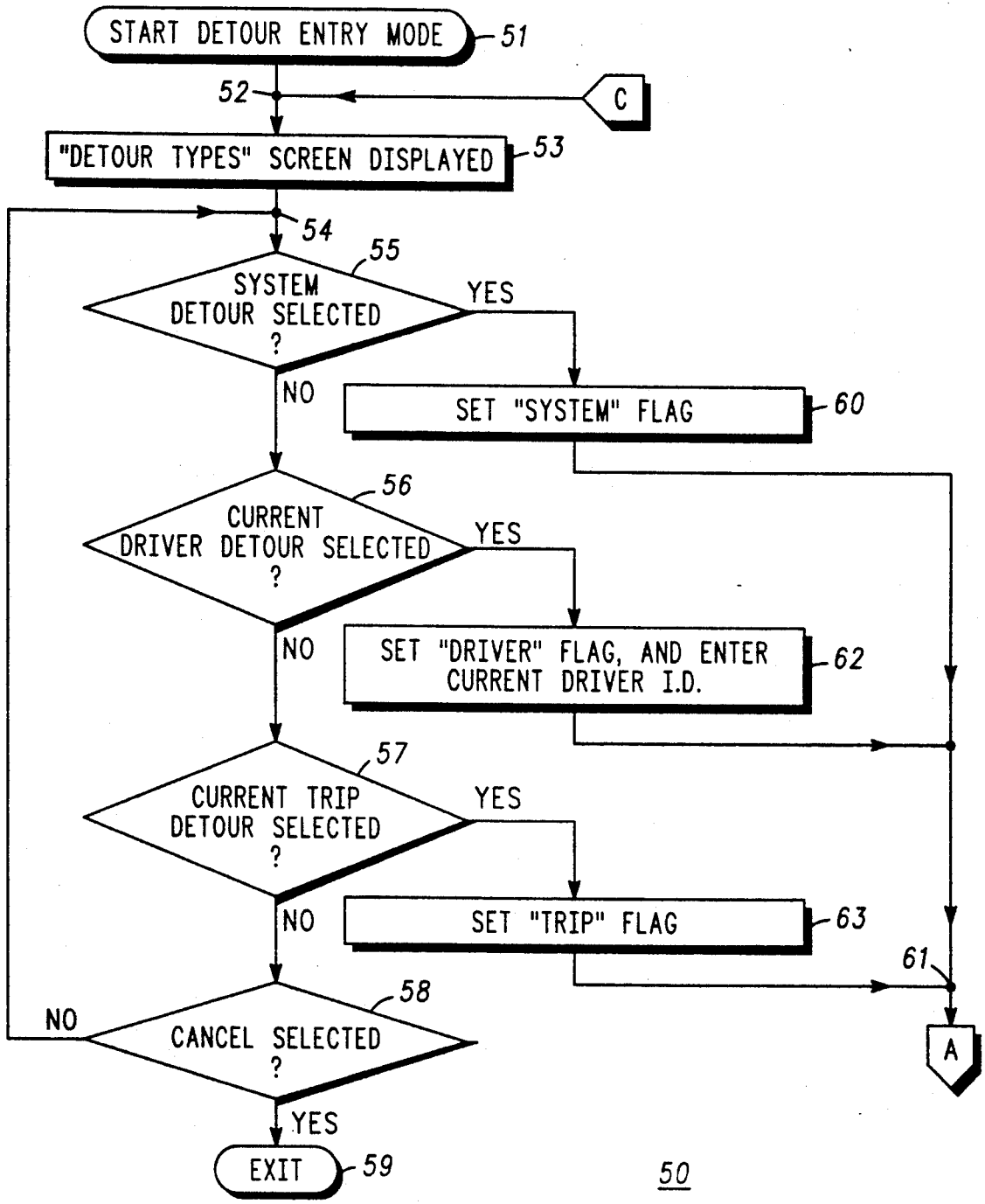
FIGS. 3A, 3B and 3C together illustrate a detour data entry flowchart describing operation of the system shown in FIG. 1.
Figure 3B:
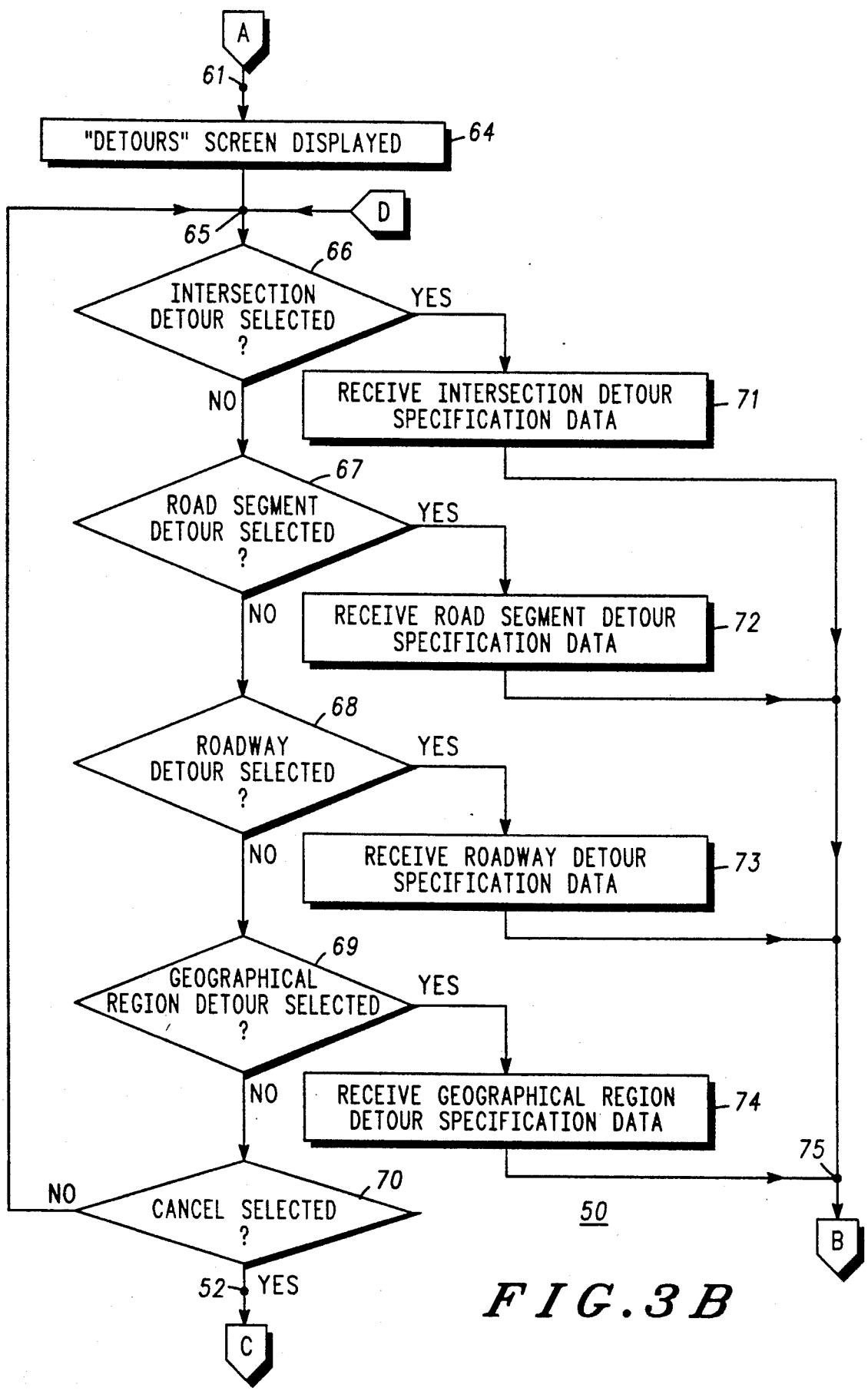
Figure 3C:
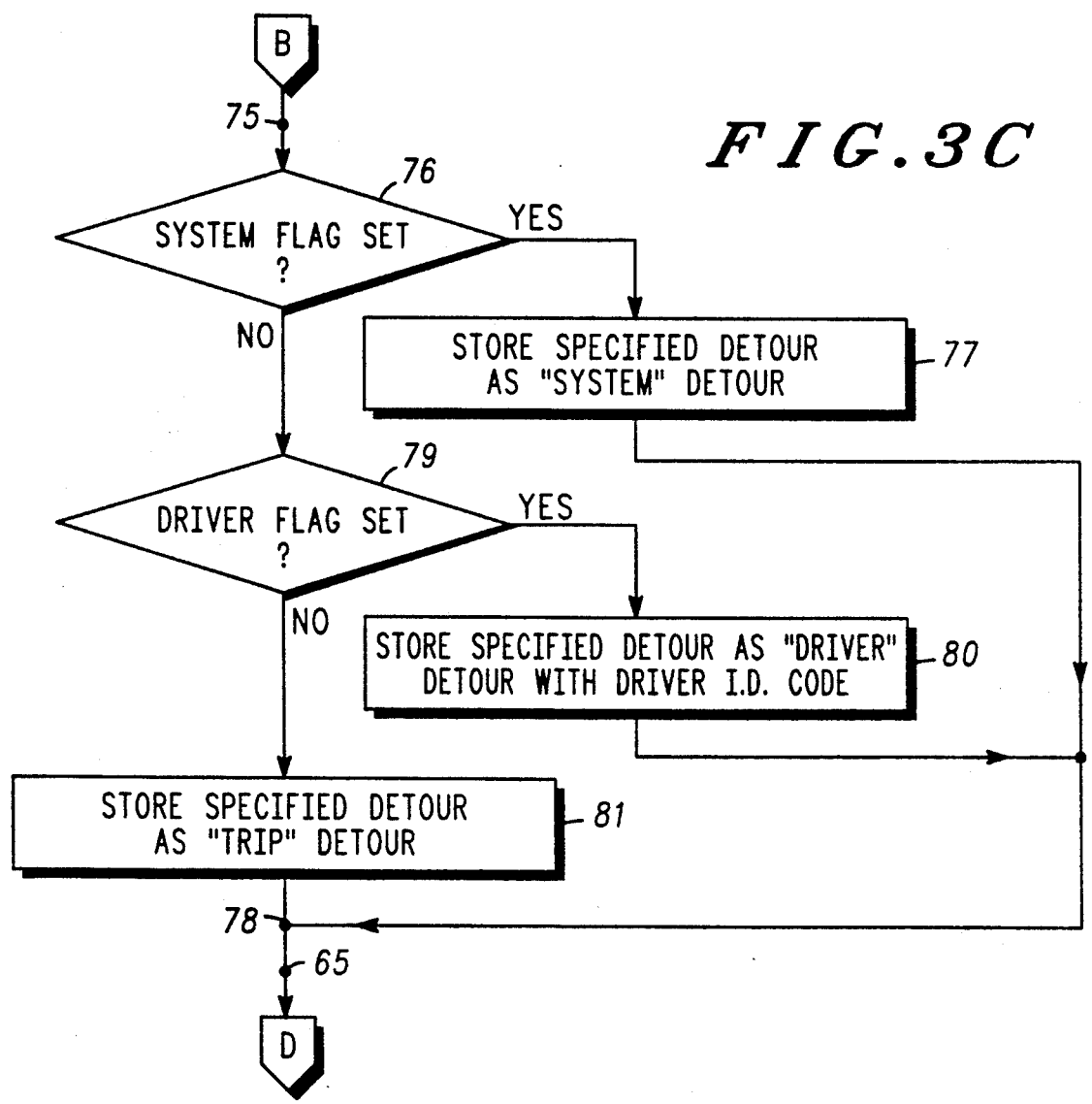

After entry of all of the detour data by the process block 44 implementing the flowchart in FIGS. 3A, 3B and 3C, control passes to sequential process blocks 45, 46 and 47. Block 45 retrieves all system detours in memory 23 which have been user specified and are intended to apply to all trips to any destination by any vehicle driver. Process block 46 retrieves any additional driver detours in memory 24 wherein the system user has specified these detours as corresponding to a specific driver ID code and block 32 has identified that the route to be calculated is for a driver who has an ID code corresponding to this specified driver ID code. In other words, block 46 determines who the current vehicle driver is, as determined by block 32, and then recalls or retrieves any driver detours for the driver ID code specified by block 32. Block 47 then retrieves from memory 25 any other detour data which is not either a system detour or a driver detour, and therefore this detour data is a trip detour intended only for application to this trip. After the block 47 control passes to the terminal 38 and then again onto the subsequent blocks 39 through 42A whose functions have been previously described.

It should be noted that the detours retrieved by the blocks 45 through 47 are additive in that the composite of all of these detours it is what is sent via block 41 to the route planning module 19 as detour data. However, since some detours apply to all trips whereas other detours apply to some trips but fewer than all trips, the blocks 45 through 47 represent the inherent creation of a hierarchy of detour data. It is this creation of a detour hierarchy, by which the system user can designate where in this hierarchy any detour data shall be placed, which is a main feature of the system 10. This is what provides the system 10 with desired flexibility to eliminate unnecessary reentry of prior detour data.

Referring now to FIGS. 3A, 3B and 3C, the manner in which the system user enters detour data and designates it as either system or subsystem (driver or trip) detour data will now be discussed.

Referring to FIGS. 3A, 3B and 3C, a detour data entry flowchart 50 is illustrated. The FIGS. 3A, 3B and 3C each show a portion of the flowchart 50. Alphabetic designations A through D are used for entry and exit locations to show the relationship between the flowchart portions shown in FIGS. 3A, 3B and 3C. The flowchart 50 is entered if the user of the system, at process block 44 in FIG. 2, designates that he desires to enter the detour data entry mode. The flowchart 50 starts at a start detour entry mode block 51 and continues to a terminal 52 after which a "Detour Types" screen display is displayed via a process block 53 on the CRT display 17. FIG. 4 illustrates the visual graphics provided by the CRT display 17 by the process block 53. FIG. 4 is just a text listing of the different types of detours which a system user may desire to specify wherein these types of detours are either system detours or subsystem detours. The subsystem detours comprise current driver detours or current trip detours. Each detour type is identified with its own reference numeral 1, 2 or 3.

After the block 53 control passes to a terminal 54 and then onto a decision block 55 which inquires if the user has advised the navigation computer 13 that he has selected a system detour for entry into the system. If not, control passes to a decision block 56 which asks if the system user has selected entering detour data as current driver detour data. If not, control passes to another decision block 57 which inquires if the user has indicated that the detour data to be entered is current trip detour data. If the answer to all of these questions is no, control passes to a decision block 58 which asks if the system user has selected cancellation of the detour data entry mode. This cancellation is caused by the user providing an input from the input devices 11 or 12 that indicates that the detour data entry mode should be cancelled. If so, control passes to an exit process block 59 which results in returning information flow to the route plan flowchart 30 such that the process block 45 is next encountered. If the user hasn't yet selected which type of detour information he wants to enter, but he hasn't cancelled the detour data entry mode, control passes from block 58 to the terminal 54 for reexecution of the decision blocks 55 through 58.

If the system user indicates that he wants to enter system detour data information, he would type a 1 via the input device 11 and this would result in the decision block 55 channeling information flow to a process block 60 which would set a "system" flag. Then control passes to a terminal 61. Similarly, if the user selects the entry of current driver detour data by typing a 2 via device 11, then decision block 56 channels information flow to a process block 62 that sets the "driver" flag and reads the current driver ID code which will now be entered by the system user in response to a computer/person dialog implemented by the computer 13. After the process block 62 control passes to the terminal 61. If current trip detour designation is selected by the user, the decision block 57 channels information flow to a process block 63 which sets a "trip" flag and then information flow passes to the terminal 61.

After terminal 61, a process block 64 results in the CRT display 17 displaying the "Detours" screen which has the graphics illustrated in FIG. 5. This screen identifies to the system user the different types or formats of detour information that he may specify for the type of detour which he designated via the decision blocks 55 through 57. Thus once the system user has designated what general type of detour data (system, driver or trip) is to be entered, then he may specify the detour data as comprising an intersection, a road segment, an entire roadway or a geographical region. This is because sometimes a driver just wishes to avoid a particular intersection, whereas other times he wants to avoid an entire roadway or a specific segment of a road or an entire geographical region. An example of a geographical region to avoid is the downtown area of a city which traditionally would have very congested traffic which the driver wishes to avoid. Thus the driver will essentially determine the format of the detour data to be entered by selecting one of the detour formats identified by the "Detours" screen shown in FIG. 5. This is essentially implemented by the information flow from the process block 64 passing to a terminal 65 and then onto sequential decision blocks 66, 67, 68, 69 and 70 which generally function in the same manner as the string of sequential decision blocks 55 through 58 previously discussed.

If the system user does not select what type of detour format he desires for the detour information to be entered, and he does not implement a cancel command, then control from the decision block 70 recirculates to the terminal 65. If the system user does select a cancel command, then the decision block 70 results in channeling information flow back to terminal 52. Thus it can been seen if the system user wants to exit the entire detour data entry mode after the "Detours" screen is displayed, first he selects the cancel command and achieves the display of the "Detour Types" screen, and then he again selects the cancel command so as to implement the exit block 59 and return to the flowchart 30.

Once the system user has selected what type of detour data format is desired, then process blocks 71 through 74 receive user specified detour data provided by the system user in accordance with which one of the decision blocks 66 through 69 effectively received a positive response from the system user. After receiving detour data via any one of the process blocks 71 through 74, control passes to a terminal 75 and from there onto blocks which essentially examine the detour type flags which have been set. If the system flag has been set, then a decision block 76 stores the specified detour data as system detour information via a process block 77 and control passes to a terminal 78. If the driver detour flag is set, a decision block 79, via a process block 80, will store the user specified detour data as "driver" detour data associated with the driver ID code previously read by the process block 62. Again, after the block 80 control passes to the terminal 78. If neither the system nor the driver detour flag is set, the decision blocks 76 and 79 channel information flow to a process block 81 which stores the user specified detour data as "trip" detour data since this is the only other possible classification for detour data in the route planning system 10 as described herein. After the process block 81 again control passes to the terminal 78. From the terminal 78 information flow passes to the terminal 65 so that additional detour information of the same general detour type (system, driver or trip) can be input by the system user.

It should be noted that the setting of any detour flag by any of the process blocks 60, 62 or 63 results in the resetting to zero of any previously set detour flag and that the exit process block 59 also results in the resetting to zero of all of the system, driver and trip detour flags.

From the above described system operation, it is clear that the route planning system 10 enables the user to designate detour information in a hierarchy by defining detour information as comprising either system, driver or trip detour information. All this is implemented by the flowchart 50. Then the flowchart 30 illustrates how the route planning module 19 utilizes this detour data, in accordance with the type of detour data which was designated by the system user, so as to calculate a desired route to a user specified desired destination. Thus a system user need only specify a desired detour once when he desires that detour to apply to every trip to be calculated for any driver. If he wants to designate detour information such that the detour information would only apply to his trips to any location, but not to trips by other drivers to any location, the system 10 also permits him to accomplish this by entering the detour information, as driver detour data, only once. If, in addition, the system user desires to implement detour information which is only to be used for a specific trip, again the system 10 allows this to be accomplished by entering the detour information only once. Other prior systems would have required multiple entries of the same detour information in order to achieve a similar end result and this would involve significantly more time and effort by the system user. In addition, prior systems have never suggested coding detour information with different driver ID codes such that for an identified driver one set of detour information is retrieved and utilized for route planning, whereas for a different identified driver a different set of detour information is retrieved and utilized. This will also reduce the time required by a system user to enter and reuse detour data for all trips by a specific driver, but not have those detours apply to trips by others. Also, the same CRT display 17 is used to assist the system user in entering detour information as is used to provide route information to the system user concerning the calculated route. This saves hardware needed for implementing the system 10.

While I have shown and described specific embodiments of this inventions, further modifications and improvements will occur to those skilled in the art. For example, while the vehicle route planning system 10 is preferably intended to be mounted in a vehicle and provide navigation information to the driver of the vehicle, a stand-alone vehicle route planning system located outside a vehicle can utilize features of the present embodiment and provide navigation information to a system user in the form of printed driving instructions or a visual graphic display of the calculated desired route. All such modifications which retain the basic underlying principles disclosed and claimed herein are within the scope of this invention.

What is claimed is:

1. A vehicle route planning system comprising:
   map memory means for storing fixed road path data corresponding to fixed roadways available for vehicle travel;
   detour means for having a system user designate, via stored detour data, which of said road path data should be excluded in calculating a desired route between vehicle start and destination locations;
   route planning means coupled to said map memory means and detour means for utilizing said fixed road path data, exclusive of the road path data corresponding to said detour data, to calculate route data defining a desired route, via said fixed roadways, for vehicle travel between said vehicle start and destination locations, and
   means for providing route information to said system user based on said calculated desired route data,
   wherein the improvement comprises said detour means comprising system detour means for having said system user designate some of said detour data as system detours and wherein said route planning means excludes road path data defined by said system detour data from use by said route planning means for calculating all of said desired routes calculated by said route planning means, said detour means also including subsystem detour means for having said system user designate some of said detour data as subsystem detours and wherein said route planning means excludes road path data defined by said subsystem detour data from use by said route planning means for calculating some, but fewer than all, of said desired routes which may be calculated by said route planning means.

2. A vehicle route planning system according to claim 1 wherein said subsystem detour means includes means for having a user designate at least some of said subsystem detour data as trip detour data associated with a planned trip to a specific user specified destination location, and wherein said route planning means, in response to said trip detour data, excludes from use road path data corresponding to said trip detour data only when calculating desired routes to said specific user specified destination location.

3. A vehicle route planning system according to claim 2 wherein said subsystem detour means includes means for having a user designate at least some of said subsystem detour data as driver detour data associated with an ID code identifying a vehicle driver and wherein said route planning means excludes road path data corresponding to said driver detour data for all desired routes to be calculated between any start and designation locations for a vehicle driver identified to said system as having an ID code corresponding to the ID code associated with said driver detour data.

4. A vehicle route planning system according to claim 3 which includes means for a system user entering a driver ID code which identifies to said system the vehicle driver for whom said desired route is to be calculated.

5. A vehicle route planning system according to claim 4 wherein said subsystem driver detour means includes means for designating and storing some driver detour data as associated with a first driver ID code and designating and storing some driver detour data as associated with a second and different driver ID code.

6. A vehicle route planning system according to claim 1 wherein said subsystem detour means includes means for having a user designate at least some of said subsystem detour data as driver detour data associated with an ID code identifying a vehicle driver and wherein said route planning means excludes road path data corresponding to said driver detour data for all desired routes to be calculated between any start and designation locations for a vehicle driver identified to said system as having an ID code corresponding to the ID code associated with said driver detour data.

7. A vehicle route planning system according to claim 6 which includes means for a system user entering a driver ID code which identifies to said system the vehicle driver for whom said desired route is to be calculated.

8. A vehicle route planning system according to claim 6 wherein said subsystem driver detour means includes means for designating and storing some driver detour data as associated with a first driver ID code and designating and storing some driver detour data as associated with a second and different driver ID code.

9. A vehicle route planning system comprising:
means for storing start position data defining an initial vehicle start location;
means for a system user selecting a desired destination location and storing destination data defining said desired vehicle destination location;
map memory means for storing fixed road path data corresponding to fixed roadways located at least between said start and destination locations;
detour means for having said system user designate, via stored detour data, which of said road path data should be excluded in calculating a desired route between said start and destination locations;
route planning means coupled to all of the above recited means for utilizing said start and destination data and said fixed road path data, exclusive of the road path data corresponding to said detour data, to calculate and store in memory route data defining a desired route, via said fixed roadways, for vehicle travel between said vehicle start and desired destination locations, and
means for providing route information to said system user based on said calculated desired route data,
wherein the improvement comprises said detour means comprising system detour means for having said system user designate some of said detour data as system detours and wherein said route planning means excludes road path data defined by said system detour data from use by said route planning means for calculating all of said desired routes calculated by said route planning means regardless of the identity of a vehicle driver and regardless of said start and destination locations, said detour means also including subsystem detour means for having said system user designate some of said detour data as subsystem detours and wherein said route planning means excludes road path data defined by said subsystem detour data from use by said route planning means for calculating some, but fewer than all, of said desired routes which may be calculated by said route planning means.

10. A vehicle route planning system according to claim 9 wherein said subsystem detour means includes means for having a user designate at least some of said subsystem detour data as trip detour data associated with a planned trip to a specific user specified destination location, and wherein said route planning means, in response to said trip detour data, excludes from use road path data corresponding to said trip detour data only when calculating desired routes to said specific user specified destination location regardless of the identity of a vehicle driver.

11. A vehicle route planning system according to claim 10 wherein said subsystem detour means includes means for having a user designate at least some of said subsystem detour data as driver detour data associated with an ID code identifying a vehicle driver and wherein said route planning means excludes road path data corresponding to said driver detour data for all desired routes to be calculated between any start and designation locations for a vehicle driver identified as having an ID code corresponding to the ID code associated with said driver detour data.

12. A vehicle route planning system according to claim 9 wherein said subsystem detour means includes means for having a user designate at least some of said subsystem detour data as driver detour data associated with an ID code identifying a vehicle driver and wherein said route planning means excludes road path data corresponding to said driver detour data for all desired routes to be calculated between any start and designation locations for a vehicle driver identified as having an ID code corresponding to the ID code associated with said driver detour data.

13. A vehicle route planning system according to claim 12 wherein said subsystem driver detour means includes means for designating and storing some driver detour data as associated with a first driver ID code and designating and storing some driver detour data as associated with a second and different driver ID code.

14. A vehicle route planning system according to claim 13 which includes means for a system user entering a driver ID code which identifies to said system the vehicle driver for whom said desired route is to be calculated.

15. A vehicle route planning system comprising:
means for obtaining start position data defining an initial vehicle start location;
means for a system user selecting a desired destination location and storing destination data defining said desired vehicle destination location;
map memory means for storing fixed road path data corresponding to fixed roadways located at least between said start and destination locations;
detour means for having said system user designate, via stored detour data, which of said road path data should be excluded in calculating a desired route between said start and destination locations;
route planning means coupled to all of the above recited means for utilizing said start and destination data and said fixed road path data, exclusive of the road path data corresponding to said detour data, to calculate and store in memory route data defining a desired route, via said fixed roadways, for vehicle travel between said vehicle start and desired destination locations, and means for visually providing route information to said system user based on said calculated route data, wherein the improvement comprises said detour means comprising system detour means for having said system user designate some of said detour data as system detours and wherein said route planning means excludes road path data defined by said system detour data from use by said route planning means for calculating all of said desired routes calculated by said route planning means regardless of the identity of a vehicle driver and regardless of said start and destination locations, said detour means also including subsystem detour means for having said system user designate some of said detour data as trip detour data associated with a planned trip to a specific user specified destination location, and wherein said route planning means, in response to said trip detour data, excludes from use road path data corresponding to said trip detour data only when calculating desired routes to said specific user specified destination location regardless of the identity of a vehicle driver, and wherein said subsystem detour means includes means for having a user designate at least some of said subsystem detour data as driver detour data associated with an ID code identifying a vehicle driver and wherein said route planning means excludes road path data corresponding to said driver detour data for all desired routes to be calculated between any start and designation locations for a vehicle driver identified to said system as having an ID code corresponding to the ID code associated with said driver detour data.

16. A vehicle route planning system according to claim 15 which includes means for a system user entering a driver ID code which identifies to said system the vehicle driver for whom said desired route is to be calculated.

17. A vehicle route planning system according to claim 16 wherein said subsystem driver detour means includes means for designating and storing some driver detour data as associated with a first driver ID code and designating and storing some driver detour data as associated with a second and different driver ID code.

18. A vehicle route planning system according to claim 16 wherein said detour means includes a visual display device providing visual displays used to assist said system user in designating system, driver and trip detours.

19. A vehicle route planning system according to claim 15 wherein said detour means includes a visual display device providing visual displays used to assist said system user in designating said system, driver and trip detours.

20. A vehicle route planning system according to claim 19 wherein said visual display device is also used by said visual route information means to provide said route information to said system user.

21. A vehicle route planning system comprising:
map memory means for storing fixed road path data corresponding to fixed roadways available for vehicle travel;

detour means for having a system user designate, via stored detour data, which of said road path data should be excluded in calculating a desired route between vehicle start and destination locations;

route planning means coupled to said map memory means and detour means for utilizing said fixed road path data, exclusive of the road path data corresponding to said detour data, to calculate route data defining a desired route, via said fixed roadways, for vehicle travel between said vehicle start and destination locations, and means for providing route information to said system user based on said calculated route data, wherein the improvement comprises said detour means comprising driver detour means for having a user designate at least some of said detour data as driver detour data associated with an ID code identifying a vehicle driver and wherein said route planning means excludes road path data corresponding to said driver detour data for all desired routes to be calculated between any start and designation locations for a vehicle driver identified to said system as having an ID code corresponding to the ID code associated with said driver detour data.

22. A vehicle route planning system according to claim 21 which includes means for a system user entering a driver ID code which identifies to said system the vehicle driver for whom said desired route is to be calculated.

23. A vehicle route planning system according to claim 22 wherein said driver detour means includes means for designating and storing some driver detour data as associated with a first driver ID code and designating and storing some driver detour data as associated with a second and different driver ID code.

24. A vehicle route planning system according to claim 21 wherein said driver detour means includes means for designating and storing some driver detour data as associated with a first driver ID code and designating and storing some driver detour data as associated with a second and different driver ID code.

25. A vehicle route planning system according to claim 21 wherein said detour means includes a visual display device providing visual displays used to assist said system user in designating said driver detours 26. A vehicle route planning system comprising:
map memory means for storing fixed road path data corresponding to fixed roadways available for vehicle travel;

route planning means coupled to said map memory means for utilizing said fixed road path data to calculate route data defining a desired route, via said fixed roadways, for vehicle travel between vehicle start and destination locations, and means for providing route information to a system user based on said calculated route data, wherein the improvement comprises driver memory means for having a user designate and store some data as driver route calculation data associated with an ID code identifying a vehicle driver and wherein said route planning means recalls and utilizes said stored driver route calculation data for calculating routes for a vehicle driver identified to said system as having an ID code corresponding to the ID code associated with said driver route calculation data.

27. A vehicle route planning system according to claim 26 which includes means for a system user entering a driver ID code which identifies to said system the vehicle driver for whom a desired route is to be calculated.

28. A vehicle route planning system according to claim 27 wherein said driver memory means includes means for designating and storing some driver route calculation data as associated with a first driver ID code and designating and storing some driver route calculation data as associated with a second and different driver ID code.

* * * * *